US012564184B2

(12) United States Patent

Kaye et al.

(10) Patent No.: US 12,564,184 B2

(45) Date of Patent: Mar. 3, 2026

(54) OVITRAP AND METHOD OF CONTROLLING VECTOR BORN DISEASE

(71) Applicant: Brandenburg Innovation Limited, West Midlands (GB)

(72) Inventors: Mathew V. Kaye, West Midlands (GB); Carl Baptista, West Midlands (GB); Shankar Seetharam, West Midlands (GB)

(73) Assignee: Brandenburg Innovation Limited (GB)

( * ) Notice: Subject to any disclaimer, the term of this patent is extended or adjusted under 35 U.S.C. 154(b) by 33 days.

(21) Appl. No.: 18/209,330

(22) Filed: Jun. 13, 2023

(65) Prior Publication Data

US 2024/0251776 A1 Aug. 1, 2024

Related U.S. Application Data

(63) Continuation of application No. 16/643,287, filed as application No. PCT/IB2018/000965 on Aug. 30, 2018, now abandoned.

(30) Foreign Application Priority Data

Aug. 30, 2017 (GB) ...................................... 1713908

(51) Int. Cl.
*A01M 1/10* (2006.01)
*A01M 1/02* (2006.01)
(Continued)

(52) U.S. Cl.
CPC ............ *A01M 1/106* (2013.01); *A01M 1/023* (2013.01); *A01M 1/04* (2013.01); *A01N 37/12* (2013.01);
(Continued)

(58) Field of Classification Search
CPC ... A01M 1/106; A01M 1/04; A01M 2200/012
See application file for complete search history.

(56) References Cited

U.S. PATENT DOCUMENTS 321,437 A * 7/1885 Horton .................. A01M 1/106
43/118
1,371,870 A * 3/1921 Demko ................. A01M 1/106
43/122

(Continued)

FOREIGN PATENT DOCUMENTS

CA 2623601 A1 6/2008
CN 100411513 X 8/2008
(Continued)

OTHER PUBLICATIONS

Boisvert, Mario, and Jacques Boisvert. "Effects of Bacillus Thuringiensis Var. Israelensis on Target and Nontarget Organisms: A Review of Laboratory and Field Experiments." Biocontrol Science and Technology, vol. 10, No. 5, 2000, pp. 517-561 (Year: 2010).*

(Continued)

*Primary Examiner* — Peter M Poon
*Assistant Examiner* — Angelica Alejandra Almeida Bonnin
(74) *Attorney, Agent, or Firm* — Fishman Stewart PLLC

(57) ABSTRACT

The present disclosure relates to an ovitrap and a method of controlling mosquito populations. The ovitrap includes a container, a cover, and a dividing mechanism for dividing the container into two regions, which in use are filled with water, and which communicate via an opening such that a first volume below the dividing mechanism defines a larvae trapping region, and a second volume above the dividing mechanism defines an egg receiving region A light source having a cool, white spectra with two peaks is mounted above the container and positioned to direct light downwards at a water surface, such that the larvae move in a (Continued)

Vb 102 direction away from the light source, from the second volume into the first volume below the dividing mechanism via the opening. A gating mechanism is operatively linked to the light source for opening and closing the opening.

31 Claims, 9 Drawing Sheets

(51) Int. Cl.

| | |
|---|---|
| *A01M 1/04* | (2006.01) |
| *A01N 37/12* | (2006.01) |
| *A01N 43/40* | (2006.01) |
| *A01N 47/28* | (2006.01) |
| *A01N 63/14* | (2020.01) |
| *A01N 63/23* | (2020.01) |
| *A01N 63/30* | (2020.01) |
| *G06F 1/26* | (2006.01) |
| *H05B 47/10* | (2020.01) |
| *H05B 47/16* | (2020.01) |

(52) U.S. Cl.
CPC ............. *A01N 43/40* (2013.01); *A01N 47/28* (2013.01); *A01N 63/14* (2020.01); *A01N 63/23* (2020.01); *A01N 63/30* (2020.01); *G06F 1/26* (2013.01); *H05B 47/10* (2020.01); *H05B 47/16* (2020.01); *A01M 2200/012* (2013.01)

(56) References Cited

U.S. PATENT DOCUMENTS

| | | | | | |
|---|---|---|---|---|---|
| 2,065,047 | A | | 12/1936 | Smith | |
| 4,086,721 | A | | 5/1978 | Deas | |
| 4,642,936 | A | * | 2/1987 | Jobin | A01M 1/026 |
| | | | | | 43/122 |
| 5,392,560 | A | | 2/1995 | Donahue | |
| 5,452,540 | A | * | 9/1995 | Dowd | A01M 1/02 |
| | | | | | 43/107 |
| 5,799,436 | A | * | 9/1998 | Nolen | A01M 1/223 |
| | | | | | 43/112 |
| 5,815,980 | A | | 10/1998 | Clarke, Jr. | |
| 6,112,453 | A | | 9/2000 | Clarke, Jr. | |
| 6,637,149 | B1 | * | 10/2003 | Bauer | A01M 1/106 |
| | | | | | 43/107 |
| 7,134,238 | B2 | * | 11/2006 | Forehand | A01M 1/106 |
| | | | | | 43/107 |
| 8,479,438 | B1 | * | 7/2013 | Wilhelmi | A01M 1/2094 |
| | | | | | 43/132.1 |
| 9,585,376 | B2 | * | 3/2017 | Park | A01N 61/00 |
| 2008/0134568 | A1 | * | 6/2008 | Cowan | A01M 1/04 |
| | | | | | 424/84 |
| 2010/0083562 | A1 | | 4/2010 | Fukuhara | |
| 2012/0110892 | A1 | * | 5/2012 | Lloyd | A01M 1/106 |
| | | | | | 43/107 |
| 2013/0154257 | A1 | * | 6/2013 | Ault | F16L 33/2073 |
| | | | | | 285/259 |
| 2015/0082687 | A1 | * | 3/2015 | Neff | A01M 1/12 |
| | | | | | 43/111 |
| 2017/0000101 | A1 | * | 1/2017 | Gaugler | A01M 1/14 |
| 2019/0000059 | A1 | * | 1/2019 | Marka | A01M 1/026 |

FOREIGN PATENT DOCUMENTS

| | | | | | |
|---|---|---|---|---|---|
| CN | 205922663 | U | * | 2/2017 | |
| CN | 207707146 | U | * | 8/2018 | |
| GB | 2130865 | A | * | 6/1984 | ............. A01M 1/04 |
| JP | H0795431 | B2 | * | 10/1995 | |
| KR | 101391090 | B1 | * | 4/2014 | |
| WO | WO-9952352 | A1 | * | 10/1999 | ............. A01M 1/02 |
| WO | 2010115258 | | | 10/2010 | |
| WO | 2013082700 | | | 6/2013 | |
| WO | WO-2016096367 | A1 | * | 6/2016 | ............. F21S 6/003 |
| WO | WO-2018157255 | A1 | * | 9/2018 | ............. A01M 1/02 |

OTHER PUBLICATIONS

Simonet, D.E., Knausenberger, W.I., Townsend, L.H. et al. A biomonitoring procedure utilizing negative phototaxis of first instar Aedes aegypti larvae. Arch. Environ. Contam. Toxicol. 7, 339-347 (1978). https://doi.org/10.1007/BF02332061 (Year: 1978).*

Mellanby, Kenneth, "The Alarm Reaction of Mosquito Larvae" Entomologia Experimetalis et Applicata. vol. 1, No. 3, Aug. 1958.

Nayar et al., "A review of monomolecular surface films as larvicides and pupicides of mosquitoes", Journal of Vector Ecology, Dec. 2003; https://pubmed.ncbi.nlm.nih.gov/14714668/.

Williams et al., "Impact of a bifenthrin-treated lethal ovitrap on Aedes aegypti oviposition and mortality in north Queensland, Australia", New PubMed!, Mar. 2007; https://www.ncbi.nlm.nih.gov/pubmed/17427694.

Perich et al., "Field evaluation of a lethal ovitrap against dengue vectors in Brazil", Wiley Online Library, Jun. 2003; http://onlinelibrary.wiley.com/doi/10.1046/j.1365-2915.2003.00427.x/full.

Zeichner et al., "Laboratory testing of a lethal ovitrap for Aedes aegypti", Wiley Online Library, Jan. 2002, http://onlinelibrary.wiley.com/doi/10.1046/j.1365-2915.1999.00192.x/full.

Barrera et al. "Use of the CDC autocidal gravid ovitrap to control and prevent outbreaks of Aedes aegypti", New PubMed! Jan. 2014; https://www.ncbi.nlm.nih.gov/pubmed/24605464.

Barrera et al., "Impact of Autocidal Gravid Ovitraps on Chikungunya Virus Incidence in Aedes aegypti (Diptera: Culicidae) in Areas With and Without Traps", ResearchGate, Dec. 2016, https://www.researchgate.net/publication/311982210_Impact_of_Autocidal_Gravid_Ovitraps_on_Chikungunya_Virus_Incidence_in_Aedes_aegypti_Diptera_Culicidae_in_Areas_With_and_Without_Traps.

Johnson et al., "The State of the Art of Lethal Oviposition Trap-Based Mass Interventions for Arboviral Control" Insects Nov. 2016; http://www.mdpi.com/2075-4450/8/1/5/htm.

"UV LED technology from Seoul Viosys and SETi traps Zika-virus-transmitting mosquitoes" LEDs Magazine, Apr. 2016 http://www.ledsmagazine.com/ugc/2016/04/25/trapping-zika-virustransmitting-mosquitoes-with-the-latest-led-technology-from-seoul-viosys-and-seti.html.

Hadley, "Do Bug Zappers Kill Mosquitoes?" ThougtCo., May 2019 https://www.thoughtco.com/do-bug-zappers-kill-mosquitoes-1968054.

Pearson, Do those mosquito zapper things really work?, Sep. 2008, https://membracid.wordpress.com/2008/09/09/do-those-mosquito-zappy-things-really-work/.

Day, "Mosquito Oviposition Behavior and Vector Control", PMC, Dec. 2016; https://www.ncbi.nlm.nih.gov/pmc/articles/PMC5198213/.

"A biomonitoring procedure utilizing negative phototaxis of first instar Aedes aegypti larvae" Arch. Environm. Contam. Toxicol 7, 339-347, 1978.

* cited by examiner

FIG 7                  FIG 8
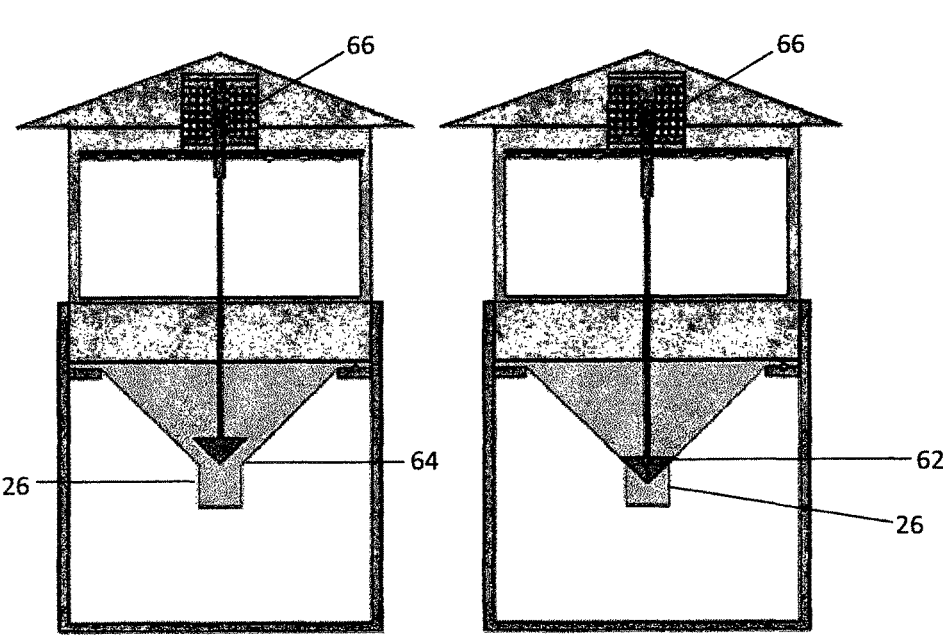
FIG 9A             FIG 9B             FIG 9C
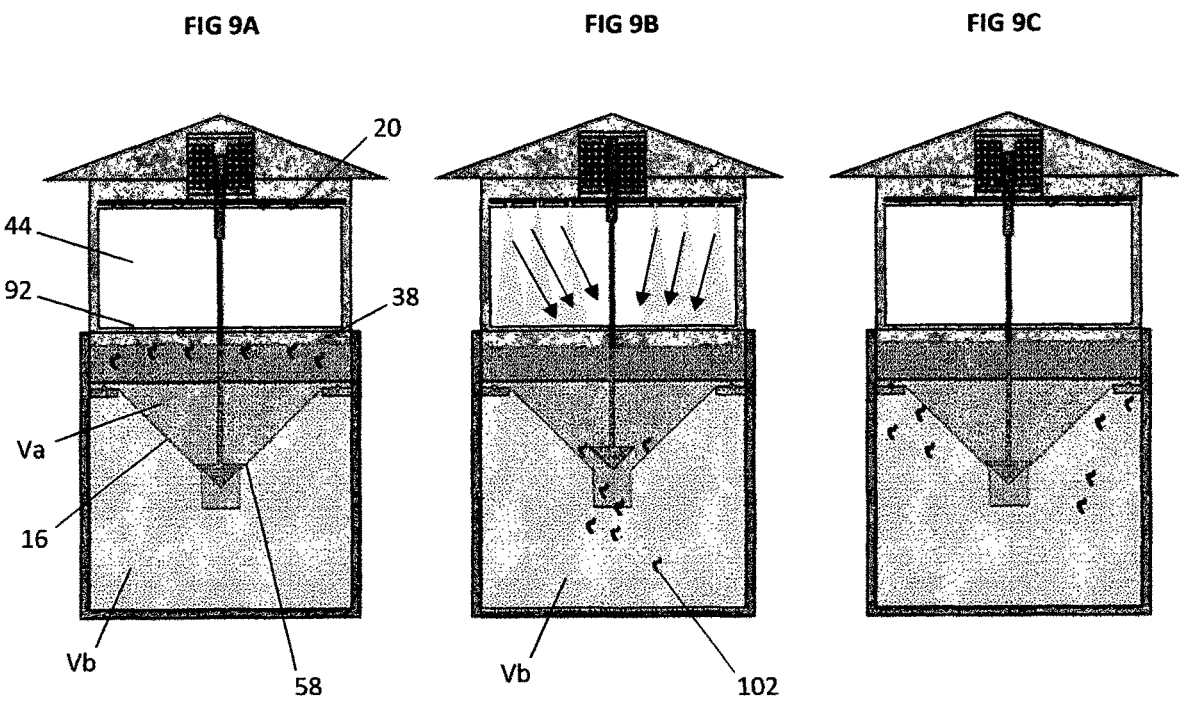

OVITRAP AND METHOD OF CONTROLLING VECTOR BORN DISEASE

CROSS-REFERENCE TO RELATED APPLICATION

This application is a continuation of and claims priority to U.S. patent application Ser. No. 16/643,287 filed Feb. 28, 2020, which claims priority to International Patent Application No. PCT/IB2018/000965 filed Aug. 30, 2018, and also claims priority to Great Britain Patent Application GB 1713908.0 filed Aug. 30, 2017, the contents of each of which is hereby incorporated reference in their entirety.

TECHNICAL FIELD

This invention relates to an ovitrap, and a method for controlling vector borne diseases, particularly those carried by mosquitoes.

More particularly it relates to the use of light to control the movement of mosquito larvae, away from the stimuli.

BACKGROUND

Mosquito borne diseases cause the most number of human fatalities yearly throughout the world, and have killed more humans than all the world wars put together. With over 2700 species of mosquitoes known globally, mosquitoes have adapted and evolved to fill many tropical and sub-tropical niches around the world. With the onset of global warming this global distribution is increasing everyday as mosquitoes find new niches to adapt and invade. They are vectors of diseases, which mean they carry diseases from one animal to another without being affected by the disease themselves. This vector disease transmission in mosquitoes is usually carried out by the female mosquitoes, as they possess the necessary mouth parts to pierce the epidermis of animals to draw out a blood meal. It is from this blood meal that female mosquitoes derive the essential amino acids for egg production and hence reproduction.

Two most notorious species of mosquito are the *Aedes aegypti* and the *Aedes albopictus* mosquitoes. Native to Africa and Asia respectively, their distribution globally has been significantly increased due to the movement of people and goods and through the impact of climate change. In many tropical countries, these 2 species of mosquitoes share the same environmental niche and in turn cause twice the disease transmission.

They are both known vectors of Dengue Fever and Dengue Haemorrhagic Fever, which account for >90 million clinically reported infections of Dengue per year in over 100 countries. Of these 90 million cases yearly, >500,000 manifest to the more virulent form of Dengue known as Dengue Haemorrhagic Fever which has a higher chance of human mortality than just Dengue alone. Every year Dengue causes>25,000 deaths.

However, with modern research and diagnostics, new emerging diseases transmitted by these mosquitoes have been identified. These include Chikungunya, Mayaro, Usutu and Zika. In 2015-2017, Zika, has been reported in 70 different countries with over 1 million cases in the Americas alone.

Female *Aedes* spp. mosquitoes preferred times for seeking a blood meal are at dawn and dusk, but biting can occur all through the day if conditions are favourable (temperature/humidity dependent). The mosquito becomes infective approximately seven days after it has bitten a person carrying these viruses. This is the extrinsic incubation period, during which time the virus replicates in the mosquito and reaches the salivary glands. The average lifespan of an *Aedes* spp. mosquito in Nature is two weeks. Female mosquitoes will lay eggs about three times in her lifetime, and about 100 eggs are produced each time. If she is infective, she can also transfer the virus to her eggs, this is known as Transovarian transmission, and is a common precursor to the start of many outbreaks. The eggs can lie dormant in dry conditions for up to about nine months, after which they can hatch if exposed to favourable conditions, i.e. water and food.

The most common methods used to control these mosquitoes are by Adulticiding and Larviciding.

Adulticiding is the administering of an insecticide through aerial spraying, or fogging, which although moderately effective, will also affect beneficial insects such as pollinators (honey bees and butterflies) or affect other insects that are vital food sources for animals throughout the food chain. Adulticing is mainly used as a last resort in the event of disease outbreaks.

Larviciding is the introduction of insecticides into the water bodies that mosquitoes lay eggs which hatch as larvae, which although moderately effective, will contaminate water sources for other animals and affect organism in the water impacting the aquatic food chain.

However, recently, developed larvicides and insecticides have achieved much greater specificity in eliminating the targeted species with little or no effect on non-targeted insects. These methods are unfortunately labour intensive and cost inhibitive in large scale programmes where mosquito control is needed the most.

However, new methods are constantly being attempted to improve control strategies including the use of genetically modified mosquitoes and motorized $CO_2$ fans to attract and trap mosquitoes.

In the research to understand the insect, its preferences, behaviour and population dynamics, scientists have developed simple tools to track *Aedes* spp populations. One of these devices, exploits the fact that these creatures require a water source for incubating eggs, and is known as an Ovitrap. Initially designed to monitor *Aedes* spp population in the field, scientist used Ovitrap devices to replicate mosquito breeding locations in a controlled manner, to attract the gravid female to these sites, where they or their eggs and larvae could be counted and analysed for research. In doing this counting, adults and larvae were being removed at their locations and scientists realised that these devices were reducing the wild type *Aedes* spp populations significantly to the point that disease transmission had abated. These traps are known as Ovitraps, eggs sinks or gravid traps.

Publications, and their Findings Include the Following:
Williams C R et al 2007
who reported Bifenthrin laced Ovitraps (known as Lethal Ovitraps) achieved 79.7% field mortality of adult *Aedes* spp;
Perich M J et al 2003 who reported significant reduction in total positive containers and lower larvae per trap when using Ovitraps in residential areas in Brazil;
Zeichnder et al 1999 who reported how the use of insecticide laden traps was able to achieve 100% control of female adults and larvae *Aedes* spp;
Barrera et al 2014 who found that placements of 3-4 Ovitraps in 81% of the homes significantly reduced dengue incidence;

Barrera et al 2016 who found a 10× reduction in mos-
quitoes and Chikungunya transmission in areas with
ovitrap deployment in Puerto Rico; and BJ Johnson et al2017
who proposed that mass deployment of Ovitraps would
significantly impact invasive *Aedes albopictus* mosquitoes
in the US.

Light, or rather light in the UV frequency, is used as an
attractant in commercial light traps for many flying insects
including mosquitoes. As disclosed in, for example: Leds-
magazine article Trapping Zika Virus Transmitting Mosqui-
toes With the Latest LED Technology From Seoul Viosys
and Seti; Membracid, Worldpress article Do Those Mos-
quito Zapper Things Really Work?; and Thoughtco article Do Bug Zappers Kill Mosquitoes.
Patent publications identified include:

WO2013/082700 discloses an apparatus and method for
reducing populations of aquatically hatched insects. In
contrast to the present invention the apparatus uses
light to attract gravid insects, as opposed to provide a
negative phototaxis response in the lavae.

Arch. Environm. Contam. Toxicol 7, 339-347 (1978)
discloses a biomonitoring procedure using negative
phototaxis, and identifies the trait to have been first
studied in the 1950's. The article however focuses on
its use to sensitively monitor toxic levels of e.g. metals.

CN100411513 discloses a sluice rainwater trapping
device with a funnel and a light channel to attract larva
towards a light channel, which the larva are said to
swim towards.

US 2010/0083562 discloses a container for capturing
mosquito larvae which comprises a funnel arrangement
which induces the larvae to an area where they find it
difficult to escape.

Applicant has exploited the fact that the larvae of mos-
quitoes *Aedes aegypti* and *Aedes albopictus* exhibit a nega-
tive phototaxis response, such that sudden intense light will
initiate a 'turn-away' response or repellent response to the
source of light, to improve the effectiveness of an ovitrap.

In particular, the behaviour exhibited enables them to:
a. Use light to 'herd' mosquitoes;
b. Trap and kill larvae without pesticides (if desired);
c. Reduce emergence of adult mosquitoes from larval/
pupae stage;
d. Minimise human intervention (service traps infre-
quently); and
e. Provide greater flexibility of mosquito operations An object of the invention is to provide an improved
ovitrap and method for controlling mosquito populations
and vector borne diseases with or without the use of pesti-
cides.

SUMMARY

In accordance with the present invention there is provided
an ovitrap comprising a container, a cover, and a means for
dividing the container into two regions, which in use are
filled with water, and which communicate via an opening
such that a volume below the means defines a larvae
trapping region, and a volume above the means defines an
egg receiving region, characterised in that a light source is
mounted above the container and is positioned to direct light
downwards at a water surface, such that when the light is
turned on to create a photo stimulus, the larvae respond by
moving in a direction away from the light, from the volume
above, into the volume below via the opening, a gating mechanism opening and closing the opening when the light
is respectively turned on and off, such that the larvae are
trapped in the volume below.

Preferably the means for dividing the contained is a
funnel comprising a mouth and a stem with an opening said
funnel being positioned inside the container.

Preferably the light source generates at least 5 lux.

Preferably the light has a colour temperature greater than
5000K.

More preferably the light source emits light which has a
cool, white spectra, with two peaks, a first peak at about 450
nm-470 nm, and a second peak at about 500 nm-700 nm.

The light source identified proved particularly good at
generating a negative phototaxis response, and contrasts to
the use of wavelengths that are generally considered to act
as attractants to mosquitos, the adult form of the larvae.

Preferably the gating mechanism comprises a plug mem-
ber which is operatively moved between a closed position,
where it is in a downward position, closing the opening in
the stem, and an open position, where it is in a raised
position, opening the opening in the stem.

In a preferred embodiment, the plug member, is carried on
a rod.

Preferably the gating mechanism is operated by a sole-
noid.

The gating mechanism is operatively linked to the light
source and the time and length the light is on, and gating
mechanism open, is carefully controlled.

Gating can last for a time period which lasts anywhere
from a few seconds to several minutes, with a preferred
period of 30 seconds to a minute, or two, depending on the
geographical location and target species.

The light and gate may be triggered to operate in synch',
together, or there can be a short delay between the two. I.e.
(i) gate open, followed by light on, and gate closed, followed
by light off or (ii) light on, followed by gate open, and light
off followed by gate closed.

Preferably the gating mechanism and light source are
controlled by a clock and/or a light sensor.

The operation, and data control is preferably managed via
a microprocessor and battery and can be controlled and
accessed remotely.

Preferably the container comprises a mechanism for locat-
ing and retaining the funnel in position in the container and
the funnel has a rim which facilitates location and retention.

Preferably the container comprises a mechanism for locat-
ing the cover and the cover has a lower portion which is
shaped to facilitate location and retention.

In a preferred embodiment, the funnel precludes light
from passing there through.

Preferably the cover comprises a lip with an internal
surface with vertical protrusions, spaced equally apart.
These vertical protrusions assist the female in positioning
herself for optimal egg laying.

More preferably at least some of the internal surfaces of
the cover and funnel are a roughened texture to assist female
surface attachment for egg laying.

In an optional embodiment, the funnel may be impreg-
nated with various insecticides or insect growth regulators
which leech slowly into the water to kill larvae and can
contaminate ovi-positioning female mosquitoes. Alterna-
tively, pesticides may be added to the water in the ovitrap by
licensed professional pest control operators.

Preferably the light source comprises a plurality of light-
emitting diode (LED) lights which are mounted directly
above the water surface and which direct the light down, at
the water, and not outwardly, which is the method used to attract mosquitos. The light, and its intensity and frequency differ from mosquito attracting light sources which typically utilise ultra violet (UV) or specific wavelengths in the visible spectrum to attract mosquitos. In contrast, the invention uses light to repel mosquito larva.

Preferably the light source is mounted on a cross member on the cover.

Preferably the gating mechanism is positioned such that the solenoid is mounted on the cover, and is seated in a cover void together with electronics, and the rod is axially aligned with the funnel stem such that the plug member can be moved, on operation, between open and closed positions.

Preferably the cover comprises side walls, with openings, which project upwardly away from a lower portion, a cross member which supports the light source, and a top portion which contains a void.

The top portion extends outwardly beyond the walls of the container and has a sloped outer surface allowing water to run off its surface.

In use, the ovitrap is filled with water and may additionally comprise attractants, insect growth regulators, insecticides (including Larvicides) or biological control agents.

Applicant has separately determined that in order to maximise efficiency, and reduce times between servicing, it is desirable to ensure the ovitrap (see e.g. FIG. 9) is continuously or intermittently topped up with water.

In one embodiment this is achieved by means of a water feed tank, which can be an integral part of the ovitrap or a separate unit, which is provided with, e.g. a hose connection and water control valve, although it will be appreciated that the control may be provided at the ovitrap, much as a float and ball valve of a toilet cistern works.

A water "auto-refill" of an ovitrap may be considered a separate and independent aspect of the invention.

Preferred insect growth regulators which may be used include Periproxifen, Methoprene and Diflubenzuron. Preferred biological control agents include *Beauveria bassiana* and *Bacillus thuringiensis* var. *israelensis*

In accordance with a second aspect of the present invention there is provided a kit comprising an ovitrap together with one or more of a water tank, water conditioning agent, mosquito eggs or larvae, replacement lights or a DNA testing kit for identifying mosquito species larvae and/or disease carrying mosquitoes in the field In accordance with a third aspect of the present invention there is provided a method of controlling mosquito populations comprising the use of light to create a photo stimulus, causing mosquito larvae to move from a location, where gravid mosquitoes have deposited their eggs, in a direction away from the light, to a location, where they are trapped and killed.

Such a method may be used as a method of disease control, through the reduction in future progeny of disease carrying mosquitoes.

BRIEF DESCRIPTION OF THE DRAWINGS

Embodiments of the invention are further described hereinafter with reference to the accompanying drawings, in which:

FIG. 7 is a cross sectional view of the ovitrap with the gating mechanism in an "open"-"lights on" position;

FIG. 8 is a cross sectional view of the ovitrap with the closure component in an "closed"-"lights off" position;

FIGS. 9A, 9B and 9C illustrate the assembled ovitrap of the invention in use;

FIG. 9A shows recently hatched larvae in a water filled ovitrap—"lights off";

FIG. 9B shows larvae moving in response to the light stimulus—"lights on";

FIG. 9C shows larvae in a water filled trap—"lights off";

DETAILED DESCRIPTION

The FIGS. illustrate an ovitrap (10) according to a first aspect of the invention.

Figure 1:
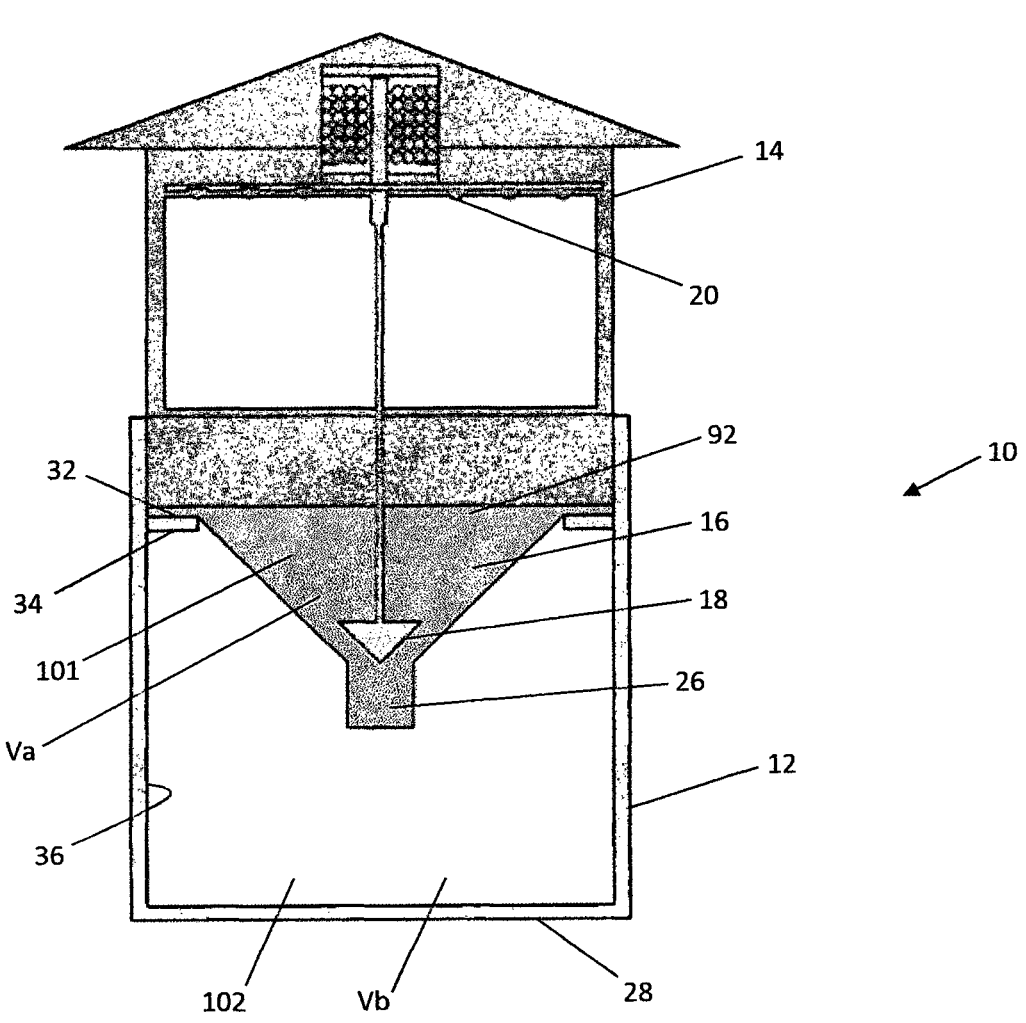
FIG. 1 is a cross sectional view of an assembled ovitrap, showing the different parts of the trap.
Figure 2:
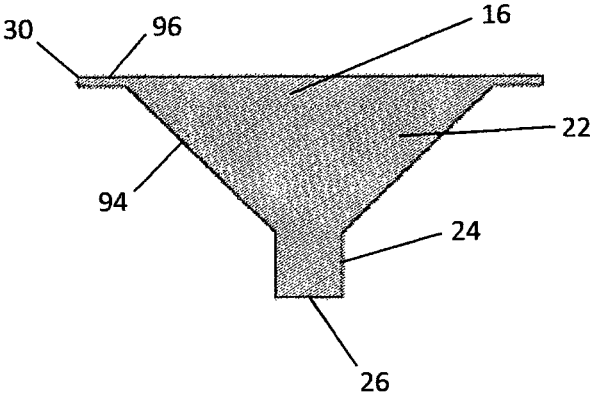
FIG. 2 is a cross sectional view of a funnel component.
Figure 3:
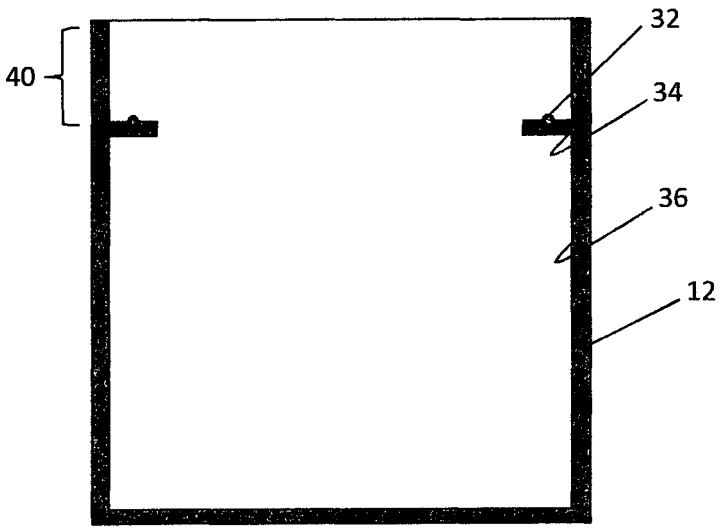
FIG. 3 is a cross sectional view of a container component.
Figure 4:
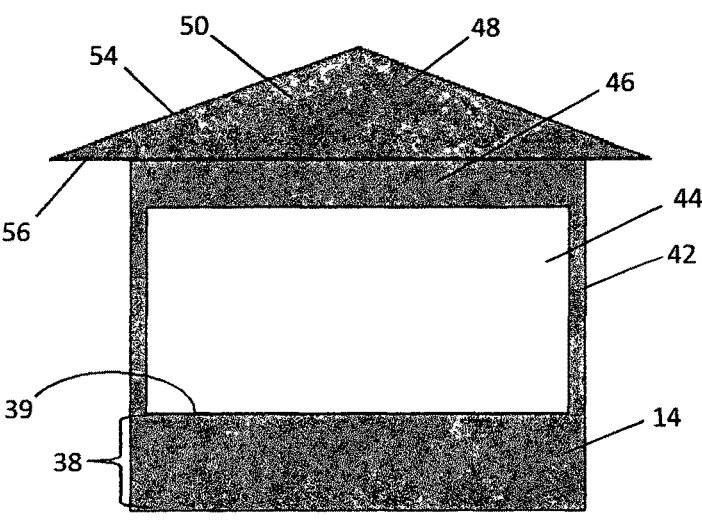
FIG. 4 is a cross sectional view of a cover component.
Figure 5:
FIG. 5 is a cross sectional view of a light array.
Figure 6:
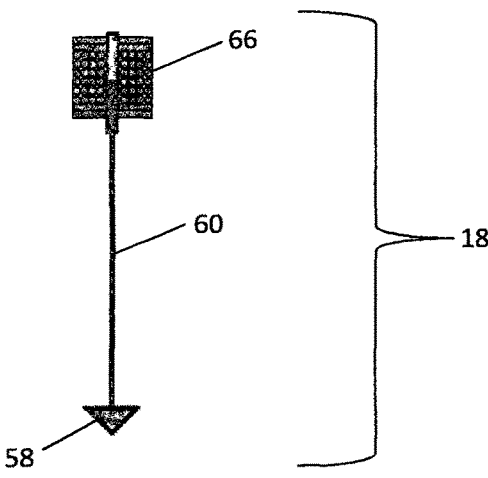
FIG. 6 is a cross sectional view of a gating mechanism.

In the FIG. 1 embodiment illustrated, the ovitrap comprises five primary structural components, (illustrated separately in FIGS. 2-6) a container (12), a cover (14), a funnel (16), a gating mechanism (18) and a light source (20).

The funnel (16) comprising a wide mouth (22) and a narrow stem (24) with an opening (26) at the bottom of the stem, which funnel is seated in the container (12), which in use is filled with water, such that its' stem (24) is positioned such that its opening (26) is located towards the base (28) of the container (12). The funnel (16) has a rim (30) with locating apertures (not shown) allowing the funnel to be retained by lugs (32), on stops (34) which project inwardly from the inner wall (36) of the container (12). The funnel (16) has a reflective inner surface (94) and a roughened upper surface (96) about the rim (30).

Figure 11:
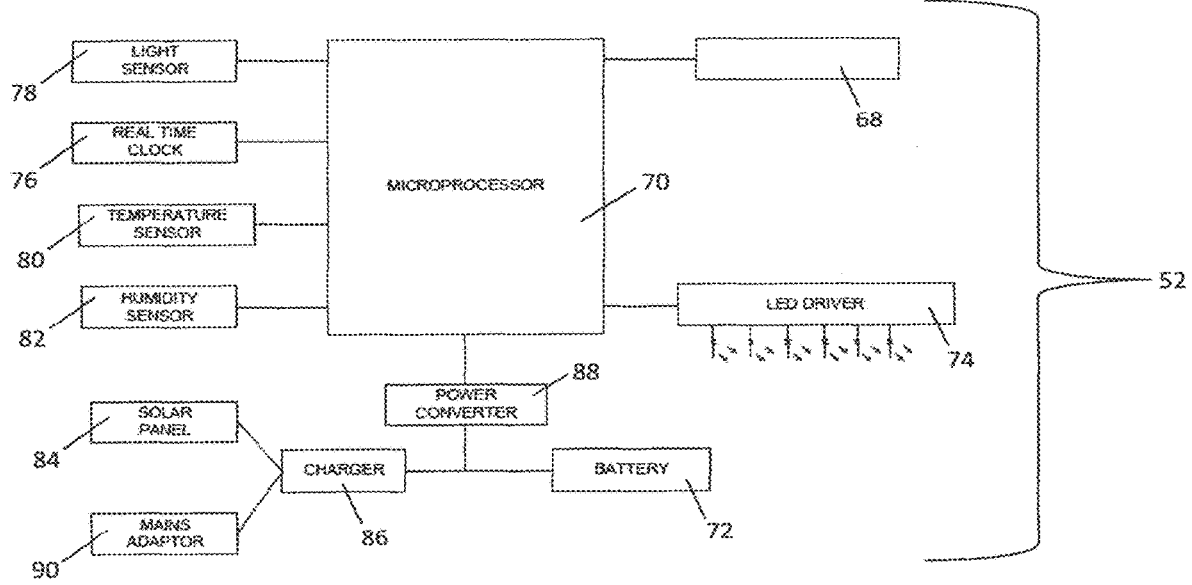
FIG. 11 is a block diagram showing the electronics for the ovitrap of FIG. 10.

Cover (14) (See FIG. 4) comprises a lower portion (38) which is shaped and sized to sit on the rim (30) of the funnel (16) snugly within the upper confines (40) of the container (12). The cover comprises side walls (42), with openings (44), which project upwardly away from the lower portion (38), a cross member (46) which supports the light source (20), and a top portion (48) which contains a void (50) and is shaped to house the gating mechanism (18), and electronics (52) as broadly illustrated in FIGS. 6 and 11. The top portion is also shaped to allow water to run off its outer surface (54) and has a portion (56) which extends peripherally beyond the container (12) boundaries. This provides an attractive environment for the gravid female mosquitoes and helps limit evaporation of water from the trap.

Mounted in the void (50) within the top portion (48) is the gating mechanism (18) which comprises a shaped plug member (58) which engages the funnel (16) where it narrows to the stem (24). The plug member sits at the end of a rod (60) which can be moved up and down from its normal closed position (62) (FIG. 8), where it is in a downward position closing the opening (26) in the stem (24), to an open position (64) (FIG. 7), where it is in a raised upward position, opening the opening (26) in the stem (24). The rod is operated by the action of a solenoid (66) which is controlled by a solenoid driver (68) operated by a micro-processor (70) powered by a battery (72) or other power source. The solenoid driver (68) is synchronised with a light (LED) driver (74) so that the mechanism is "open" when the lights (20) are turned on and "closed" when the lights (20) are turned off.

The turning on and off is controlled by a clock (76) and/or light sensor (78). The ovitrap also has a temperature sensor (80) and humidity sensor (82) for data gathering facilitating effective "remote" management.

Figure 10:
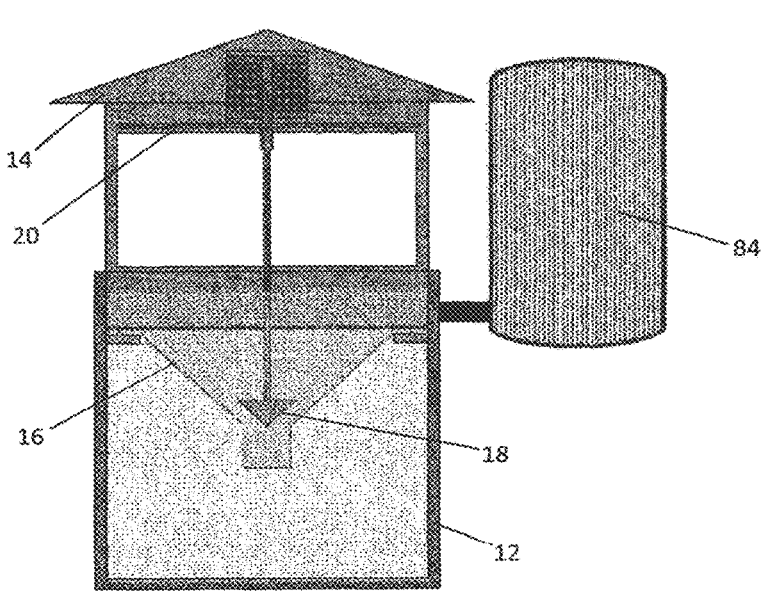
FIG. 10 shows a second embodiment of ovitrap with a solar cell.

In the FIG. 10 embodiment the trap is provided with a solar panel (84) which links with a charger (86) to the battery (72) and a power convertor (88) although the trap can also be mains operated via a mains adaptor (90) if desired.

Turning to FIG. 9a-c the following describes the devices method of operation. An ovitrap is first assembled, filled with water, preferably distilled or conditioned water (aged). To this may be added organic attractants (including mos-quito eggs), insect growth regulators, pheromones or the like and the gating mechanism checked to ensure it will operate as desired.

FIG. 9a shows an ovitrap after eggs have hatched. Before this however, a gravid mosquito will have been attracted to the trap, which is filled with water (shaded) and which may contain additional attractants to just below the container surface (92). Gravid mosquitoes enter the ovitrap via open-ings (44), land on the surface (39) of the lower cover (38) and deposit their eggs on the meniscus of a volume of water (darker hatching) above (Va), and above the funnel (16) which volume defines an egg (101) receiving region. In this state the lights (20), which are directed downwardly towards the water surface (92), are turned off, and the plug (58) of the mechanism (18) closes the funnel opening (26) separating, and preventing communication between, the volume of water above (Va) and a volume of water below (Vb) (lighter hatching).

In order to kill the larvae (102), they are "herded" from the volume above to the volume below, where they are trapped. To facilitate this movement and trapping the light (20) and gating mechanism (18) operate such that the gating mechanism is opened when the lights (20) are turned on (FIG. 9b). In response to the light stimulus, preferably a light stimulus which emits an intense light, the larvae of, particu-larly, *Aedes aegypti* or *Aedes albopictus*, swim away from the light, through the opening (26) into the volume below (Vb). The light need only be triggered for a short period, programmed anywhere up to 300 seconds, which is a sufficient duration for the larvae to move from Va to Vb, whereupon the light is switched off and the plug closed (as FIG. 9c). The trapped larvae (102) swim upwards, are trapped in the volume below (Vb), and eventually die from oxygen starvation (suffocation). Their brief presence how-ever, stimulates other gravid females to deposit eggs, and the process of turning the lights and gating mechanism on and off ensures substantially that all future larvae are trapped and suffocated, thus providing effective mosquito and disease control.

Lights may be triggered daily, every few days or weekly depending on the requirement.

As the trap allows larvae to survive for some period within the trap, but not emerge as an adult, it has the added effect of making the trap more effective over time since larvae that survive in the trap release pheromones that are detected by gravid females looking for suitable locations for egg laying. The more larvae present in the trap, the more likely nearby flying gravid females will detect it and lay eggs, as it shows that the water source is viable for its offspring.

The intense light preferably generates at least 5 lux, more preferably at least 100 lux, and more preferably still at least 200 lux. Most preferred is a light that generates between 270 and 310 lux, typically about 290 lux.

Figure 12:
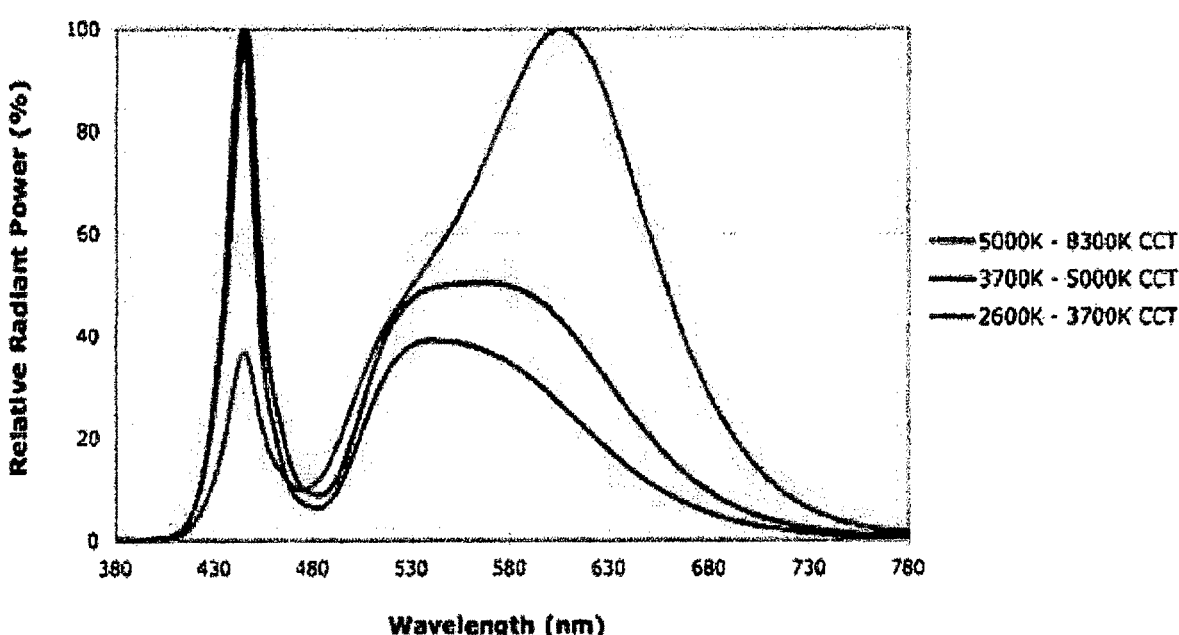
FIG. 12 is a diagram illustrating light with a colour temperature in the range 5000K-10000K.

Most preferred is a lighting which emits light with a colour temperature of greater than 5000K, more preferably still, a colour temperature in the range 5000K-10000K as illustrated in FIG. 12.

Figure 13:
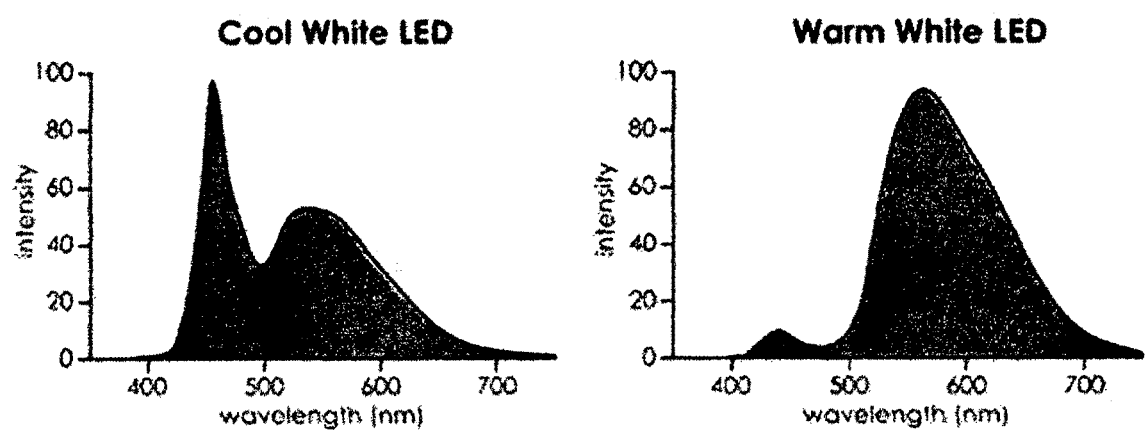
FIG. 13 is a diagram illustrating a cool white spectrum, with two peaks, a first peak at about 450 nm-470 nm and a second peak at about 500 nm-700 nm contrasted to a warm white light.

Preferably the light has a cool white spectrum, with two peaks, a first peak at about 450 nm-470 nm and a second peak at about 500 nm-700 nm as illustrated in FIG. 13.

The preferred lighting comprises a LED light source.

The funnel (16) or container (12) may be impregnated with an Insect Growth Regulator (IGR), e.g. periproxifen or methoprene and/or pheromones or other attractants that will leech out into the water body at a controlled rate over time. The leeching of such additives will be internal to the trap.

Figure 14:
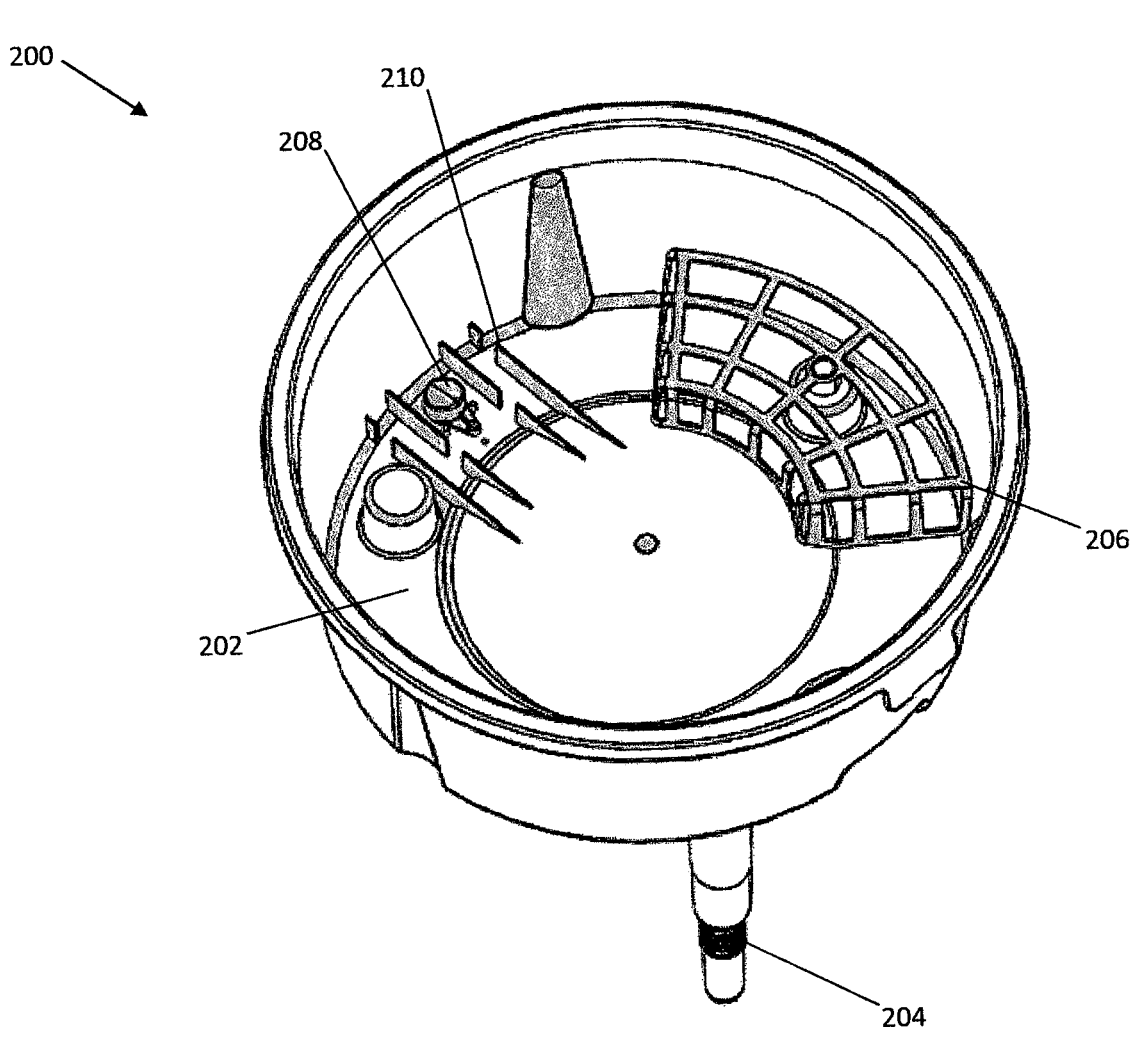
FIG. 14 is an ancillary water tank, for use with an ovitrap of the invention, with its lid removed.

FIG. 14 illustrates a water tank (200), with it's lid removed. It comprises a receptacle (202) with a plurality of height adjustable legs (204). The receptacle has a cage structure (206) for retaining a conditioning agent, such as hay, an outlet (208) and baffles (210) in the surrounding vicinity to reduce debris accumulating about the outlet.

Figure 15:
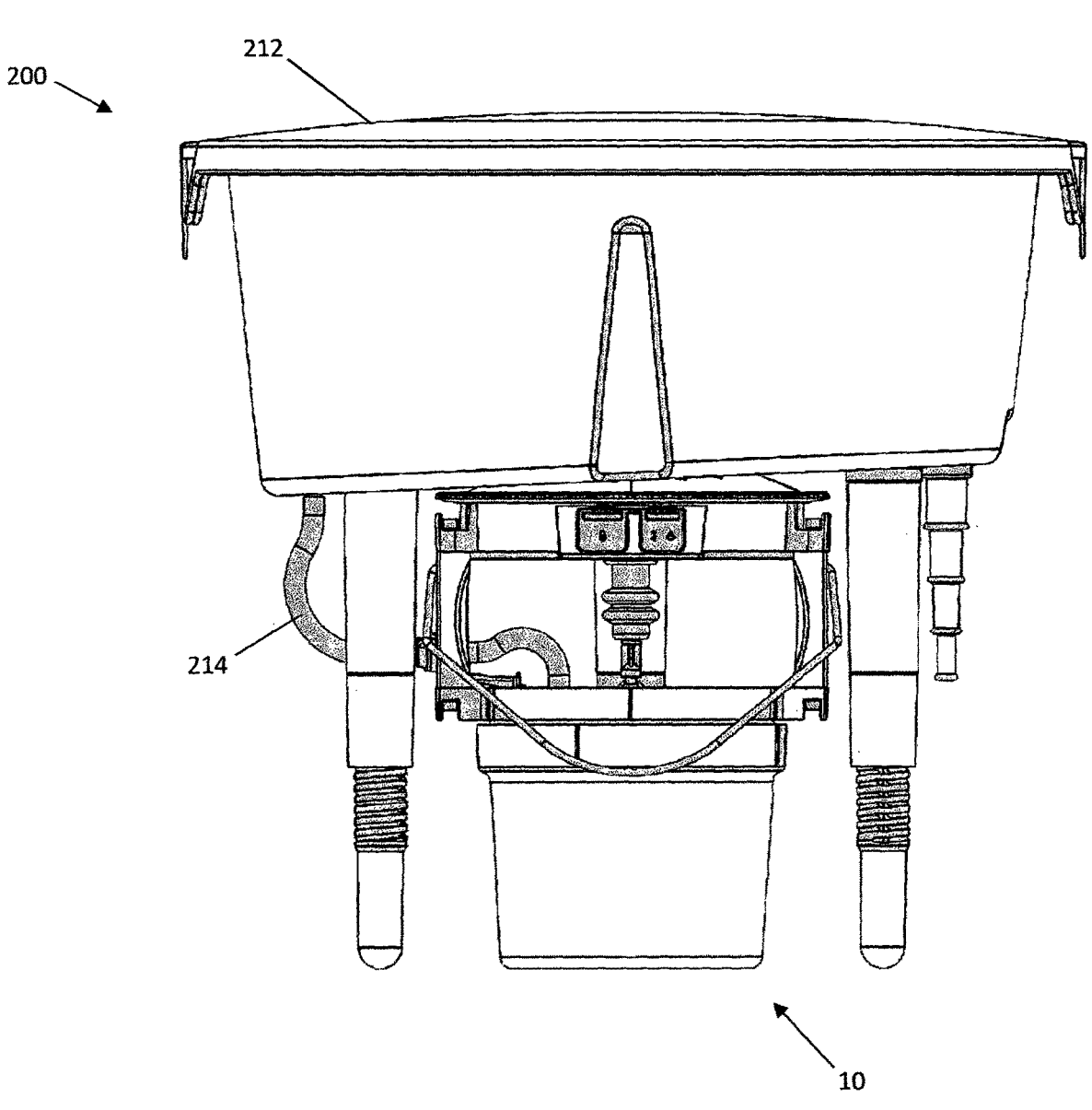
FIG. 15 is an illustration of the water tank of FIG. 14 connected to an ovitrap.
Figure 16:
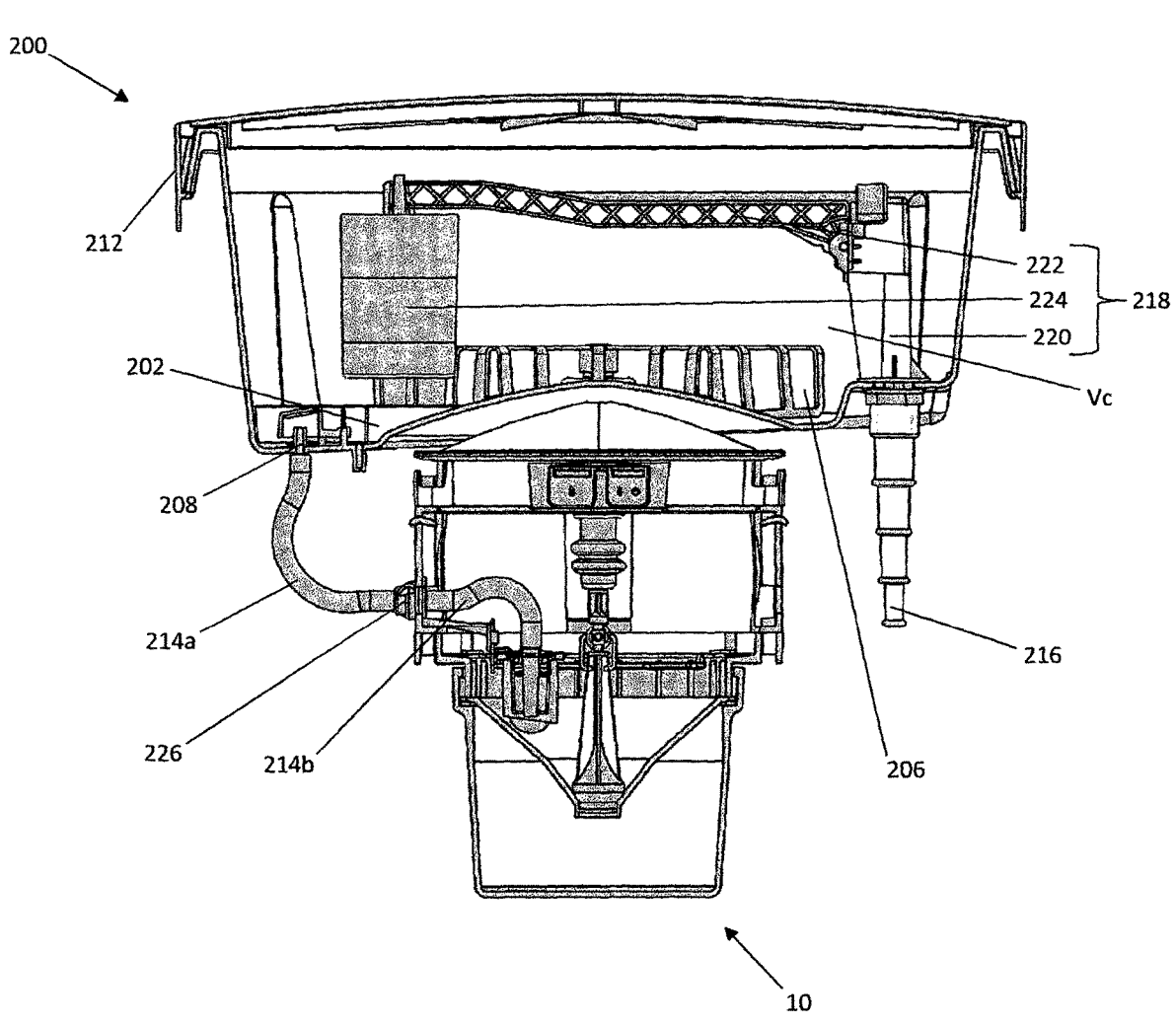
FIG. 16 is a cross section view of the embodiment illustrated in FIG. 15.

As is more clearly seen in FIG. 15 the water tank (200) is fitted with a lid (212), and a hose (214) feeds the ovitrap (10). In detail, and as shown in cross section, FIG. 16, the receptacle (202) may be filled or connected to a water supply via an inlet (216) which, as illustrated, comprises a multi diameter hose attachment. The supply may be a mains supply or e.g. a separate feed, such as a water butt. A hose (214) takes a volume of water (Vc) from the water tank to the ovitrap (10), and flow is controlled by a valve mecha-nism (218), comprising e.g. a valve body (220), float arm (222) and float (224). The hose may comprise multiple sections (214a; 214b) connected about a connector (226) provided on the ovitrap.

The invention claimed is:

1. An ovitrap comprising: a container, a cover, and a dividing mechanism for dividing the container into two regions, which in use are filled with water, and which communicate via an opening such that a first volume below the dividing mechanism defines a larvae trapping region, and a second volume above the dividing mechanism defines an egg receiving region, a light source having a cool, white spectra, with two peaks, a first peak at 450 nm-470 nm, and a second peak at 500 nm-700 nm, the light source mounted above the container and positioned to direct light down-wards at a water surface, such that when the light source is turned on to create a photo stimulus, larvae respond by moving in a direction away from the light source, from the second volume into the first volume below the dividing mechanism via the opening, and a gating mechanism opera-tively linked to the light source which opens and closes the opening when the light source is respectively turned on and off, such that the larvae are trapped in the first volume.

2. An ovitrap as claimed in claim 1, wherein the dividing mechanism is a funnel comprising a mouth and a stem with the opening, said funnel being positioned inside the con-tainer.

3. An ovitrap as claimed in claim 1, wherein the light source generates at least 5 lux.

4. An ovitrap as claimed in claim 1, wherein the light of the light source has a colour temperature greater than 5000K.

5. An ovitrap as claimed in claim 1, wherein the gating mechanism comprises a plug member which is operatively moved between a closed position, where the plug member is in a downward position closing the opening, and an open position, where the plug member is in a raised position, opening the opening.

6. An ovitrap as claimed in claim 5, wherein the plug member is carried on a rod.

7. An ovitrap as claimed in claim 5, wherein the gating mechanism is operated by a solenoid.

8. An ovitrap as claimed in claim 1, wherein the gating mechanism and light source are controlled by at least one of a clock and a light sensor.

9. An ovitrap as claimed in 1, further comprising a microprocessor and a battery.

10. An ovitrap as claimed in claim 2, wherein the container comprises a projecting mechanism for locating and retaining the funnel in position in the container and the funnel has a rim which facilitates location and retention.

11. An ovitrap as claimed in claim 1, wherein the container comprises upper confines for locating the cover, and wherein the cover has a lower portion that is shaped to facilitate location and retention.

12. An ovitrap as claimed claim 6, wherein the dividing mechanism is a funnel, and wherein the funnel and the plug member preclude light from passing therethrough.

13. An ovitrap as claimed in claim 2, wherein the funnel has a reflective inner surface and a roughened upper surface about a rim disposed on the funnel.

14. An ovitrap as claimed in claim 1, wherein a surface of the cover assists a female mosquito to position herself for optimal egg laying.

15. An ovitrap as claimed in claim 1, wherein the light source comprises a plurality of light-emitting diode (LED) lights and is mounted directly above the water surface.

16. An ovitrap as claimed in claim 15, wherein the light source is mounted on a cross member on the cover.

17. An ovitrap as claimed in claim 7, wherein the gating mechanism is positioned such that the solenoid is mounted on the cover, and is seated in a cover void together with electronics, and wherein a rod is axially aligned with a stem of the dividing mechanism such that the plug member can be moved, on operation, between open and closed positions.

18. An ovitrap as claimed in claim 17, wherein the cover comprises side walls, with openings, which project upwardly away from a lower portion, a cross member which supports the light source, and a top portion which contains the cover void.

19. An ovitrap as claimed in claim 18, wherein the top portion extends outwardly beyond walls of the container.

20. An ovitrap as claimed in claim 18, wherein the top portion has a sloped outer surface.

21. An ovitrap as claimed in claim 1, wherein the ovitrap is connected to a water tank with a mechanism ensuring an appropriate water level in the ovitrap is maintained.

22. An ovitrap as claimed in claim 21, wherein the water tank comprises a receptacle with an outlet, a lid, and a hose, and further comprises one or more of adjustable legs, a water conditioning cage, and a water inlet valve.

23. An ovitrap as claimed in claim 1, wherein the ovitrap in use is filled with water and may comprise one or more of a female mosquito attractant, insect growth regulator, insecticide or other biological control.

24. An ovitrap as claimed in claim 23, wherein the insect growth regulator is provided and comprises Periproxifen, Methoprene or Diflubenzuron.

25. An ovitrap as claimed in claim 23, wherein the biological control is provided and comprises *Beauveria bassiana*, or *Bacillus thuringiensis* var. *israelensis*.

26. An ovitrap as claimed in claim 23, wherein the attractant is provided and comprises a water conditioning agent or mosquito eggs.

27. A kit comprising an ovitrap as claimed in claim 1, together with a water tank, water conditioning agent, mosquito eggs or larvae, replacement lights or a DNA testing kit for identifying at least one of mosquito species larvae and disease-carrying mosquitoes in an environment.

28. A method of controlling mosquito populations, comprising the steps of:

using a light source having a cool, white spectra, with two peaks, a first peak at 450 nm-470 nm, and a second peak at 500 nm-700 nm to create a photo stimulus, and causing mosquito larvae to move in a direction away from the light from a first location, where gravid mosquitoes have deposited their eggs, in a direction away from the light, to a second location, where mosquito larvae are trapped and killed; and opening and closing an opening between the first location and the second location via a gating mechanism operatively linked to the light source when the light source is respectively turned on and off, such that the mosquito larvae are trapped in the second location.

29. A method as claimed in claim 28, wherein the light source generates at least 5 lux.

30. A method as claimed in claim 28, wherein the light source has a colour temperature greater than 5000K.

31. A method of disease control comprising the method as claimed in claim 28.

\* \* \* \* \*